(12) United States Patent
Li et al.

(10) Patent No.: US 11,580,925 B2
(45) Date of Patent: Feb. 14, 2023

(54) DISPLAY PANEL AND MANUFACTURING METHOD THEREOF, CONTROL METHOD AND DISPLAY APPARATUS

(71) Applicants: Beijing BOE Display Technology Co., Ltd., Beijing (CN); BOE Technology Group Co., Ltd., Beijing (CN)

(72) Inventors: Xingliang Li, Beijing (CN); Jian Zhang, Beijing (CN); Xiaoning Jiang, Beijing (CN); Peng Li, Beijing (CN); Wenyu Li, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/500,964

(22) Filed: Oct. 14, 2021

(65) Prior Publication Data
US 2022/0270559 A1    Aug. 25, 2022

(30) Foreign Application Priority Data
Feb. 23, 2021    (CN) .......................... 202110204823.6

(51) Int. Cl.
*G09G 3/36*    (2006.01)
*G02F 1/1368*    (2006.01)
(Continued)

(52) U.S. Cl.
CPC .......... *G09G 3/3618* (2013.01); *G02F 1/1368* (2013.01); *G02F 1/13439* (2013.01);
(Continued)

(58) Field of Classification Search
CPC .......... G09G 3/3618; G09G 2300/0426; G09G 2320/029; G02F 1/133512;
(Continued)

(56) References Cited

U.S. PATENT DOCUMENTS

2013/0141677 A1*  6/2013  Wu .................... G02F 1/133711
                                                        349/158
2018/0247833 A1*  8/2018  Ning ................... H01L 27/1259
(Continued)

FOREIGN PATENT DOCUMENTS

CN        106897696 A  *  6/2017  .......... G02F 1/13338

*Primary Examiner* — Alexander Eisen
*Assistant Examiner* — Kebede T Teshome
(74) *Attorney, Agent, or Firm* — Ling Wu; Stephen Yang; Ling and Yang Intellectual Property

(57) ABSTRACT

Provided are a display panel and manufacturing method thereof, control method and display apparatus. The display panel includes a first substrate including first base substrate and driving structure layer, and a second substrate including second base substrate and black matrix layer, driving structure layer includes multiple switching transistors, the display panel includes multiple pixel units, each pixel unit includes a switching transistor. One side of black matrix layer close to first substrate is provided with multiple groove structures corresponding to multiple pixel units one-to-one. Orthographic projection of black matrix layer on first base substrate covers those of multiple switching transistors on first base substrate, and orthographic projection of the groove structure on first base substrate at least partially overlaps with that of a channel region of switching transistor in corresponding pixel unit on first base substrate to enable light meeting preset wavelength condition to be incident into the display panel.

19 Claims, 8 Drawing Sheets

(51) Int. Cl.
*G02F 1/1335* (2006.01)
*G02F 1/1343* (2006.01)
*G02F 1/1362* (2006.01)

(52) U.S. Cl.
CPC .. *G02F 1/133512* (2013.01); *G02F 1/134309* (2013.01); *G02F 1/136286* (2013.01); *G09G 2300/0426* (2013.01); *G09G 2320/029* (2013.01)

(58) Field of Classification Search
CPC ........... G02F 1/134309; G02F 1/13439; G02F 1/136286; G02F 1/1368
See application file for complete search history.

(56) References Cited

U.S. PATENT DOCUMENTS

| | | | |
|---|---|---|---|
| 2020/0151416 A1* | 5/2020 | Wu | G06V 40/1318 |
| 2020/0286432 A1* | 9/2020 | Zhang | G09G 3/3258 |

* cited by examiner

DISPLAY PANEL AND MANUFACTURING METHOD THEREOF, CONTROL METHOD AND DISPLAY APPARATUS

CROSS-REFERENCE TO RELATED APPLICATION

The present application claims priority of Chinese Patent Application No. 202110204823.6 filed to the CNIPA on Feb. 23, 2021, the content of which is incorporated herein by reference.

TECHNICAL FIELD

Embodiments of the present disclosure relate to, but are not limited to, the field of display technology, and particularly relate to a display panel and a manufacturing method thereof, a control method and a display apparatus.

BACKGROUND

A Liquid Crystal Display (LCD) is a kind of a flat panel display apparatus, and gains popularity in the field of high-performance display for its small size, low power consumption, no radiation and relatively low manufacturing cost, etc.

A liquid crystal display panel and a backlight module are important components of a liquid crystal display apparatus. The backlight source is disposed on one side of the liquid crystal display panel to achieve image display. The liquid crystal display panel includes an array substrate, a color filter substrate and a liquid crystal layer disposed between the array substrate and the color filter substrate.

SUMMARY

The following is a summary of the subject matters described in the present disclosure in detail. The summary is not intended to limit the scope of protection of the claims.

In a first aspect, the present disclosure provides a display panel, which includes a first substrate and a second substrate disposed oppositely, wherein the first substrate includes a first base substrate and a driving structure layer disposed on the first base substrate, and the second substrate includes a second base substrate and a black matrix layer disposed on the second base substrate, wherein the driving structure layer includes a plurality of switching transistors, and the display panel includes a plurality of pixel units, wherein each pixel unit includes a switching transistor;

one side of the black matrix layer close to the first substrate is provided with a plurality of groove structures which correspond to a plurality of pixel units in a one-to-one manner; and an orthographic projection of the black matrix layer on the first base substrate covers orthographic projections of a plurality of switching transistors on the first base substrate, and an orthographic projection of the groove structure on the first base substrate at least partially overlaps with an orthographic projection of a channel region of a switching transistor in a corresponding pixel unit on the first base substrate to enable light meeting a preset wavelength condition to be incident into the display panel.

In some exemplary embodiments, the groove structure includes at least one groove; a difference between groove areas of any two groove structures is smaller than a threshold area, wherein the groove area is a sum of cross-sectional areas of all grooves in the groove structure; and the groove structures corresponding to pixel units in the same row or column are irregularly disposed.

In some exemplary embodiments, a cross section of the groove is U-shaped or square.

In some exemplary embodiments, a depth of the groove is 70% to 90% of a thickness of the black matrix layer.

In some exemplary embodiments, the first substrate further includes a pixel electrode layer disposed on one side of the driving structure layer away from the first base substrate, and the pixel electrode layer includes a plurality of pixel electrodes, each pixel unit includes one pixel electrode, and pixel electrodes of adjacent pixel units are disposed at intervals; and the pixel electrodes are transparent electrodes and are block electrodes.

In some exemplary embodiments, the first substrate further includes a common electrode layer disposed on one side of the pixel electrode layer away from the base first substrate; the common electrode layer includes N common electrodes, each pixel unit includes a common electrode, and a plurality of pixel units share one common electrode, $N \geq 1$;

an orthographic projection of the common electrode on the first base substrate at least partially overlaps with the orthographic projection of a pixel electrode of a pixel unit on which the common electrode is located on the first base substrate; and the common electrode are transparent electrodes and are slit electrodes.

In some exemplary embodiments, the area of each common electrode is same.

In some exemplary embodiments, the first substrate further includes a plurality of gate lines extending along a first direction and disposed along a second direction and data lines extending along the second direction and disposed along the first direction; the pixel units are defined by crossing of the gate lines and the data lines; the length of the gate line along the second direction is greater than the length of the data line along the first direction;

the first substrate further includes N detection signal lines extending along the second direction and disposed along the first direction;

the detection signal lines are disposed on a same layer as the data lines, and correspond to the common electrodes in a one-to-one manner and are electrically connected to the corresponding common electrodes; and an orthographic projection of the black matrix layer on the first base substrate covers the orthographic projections of the detection signal lines on the first base substrate, and there is an overlapping region between an orthographic projection of the detection signal line on the first base substrate and an orthographic projection of a corresponding common electrode on the first base substrate.

In some exemplary embodiments, a length of the detection signal line in the second direction is 1 to 2 times as long as a length of the data line in the second direction.

In some exemplary embodiments, the first substrate further includes a first insulating layer, a first metal layer, a second insulating layer, a semiconductor layer, a second metal layer, a third insulating layer and a fourth insulating layer sequentially disposed on the first base substrate, wherein the pixel electrode layer is disposed between the third insulating layer and the fourth insulating layer, and the common electrode layer is disposed on one side of the fourth insulating layer away from the first base substrate; and the first metal layer includes a gate line and a gate electrode of a switching transistor, the semiconductor layer includes an active layer of the switching transistor, and the second metal layer includes a data line, a detection signal line and source and drain electrodes of the switching transistor.

In some exemplary embodiments, the third insulating layer and the fourth insulating layer are provided with vias, and the common electrodes are electrically connected to corresponding detection signal lines through the vias.

In some exemplary embodiments, the display panel further includes a processor; the processor is electrically connected to the detection signal lines, and is configured to receive a detection signal from the detection signal lines, determine a position of light meeting the preset wavelength condition according to the detection signal, and control display of a pixel unit at the position of the light meeting the preset wavelength condition.

In some exemplary embodiments, a thickness of the black matrix layer is 1 to 2 microns, and a width of the black matrix layer is 20 to 40 microns; and a width of the groove is 3 to 5 microns, and a depth of the groove is 0.7 to 1.8 microns.

In some exemplary embodiments, a manufacturing material of the semiconductor layer includes amorphous silicon.

In some exemplary embodiments, a length of the channel region of the switching transistor is 2 to 4 microns and a width of the channel region of the switching transistor is 10 to 100 microns.

In some exemplary embodiments, the light meeting the wavelength condition is laser.

In a second aspect, the present disclosure further provides a display apparatus, including any of the above-mentioned display panels.

In a third aspect, the present disclosure further provides a manufacturing method for a display panel applicable to any one of the aforementioned display panel including a plurality of pixel units, the method includes:

forming a driving structure layer on a first base substrate to form a first substrate, wherein the driving structure layer includes a plurality of switching transistors, and each pixel unit includes a switching transistor;

forming a black matrix layer provided with a plurality of groove structures on a second base substrate by using a halftone mask process to form a second substrate; wherein the groove structures are disposed on one side of the black matrix layer close to the first substrate, and a plurality of groove structures correspond to a plurality of pixel units in a one-to-one manner; and an orthographic projection of the black matrix layer on the first base substrate covers orthographic projections of a plurality of switching transistors on the first base substrate, and an orthographic projection of the groove structure on the first base substrate at least partially overlaps with an orthographic projection of a channel region of a switching transistor in a corresponding pixel unit on the first base substrate to enable light meeting a preset wavelength condition to be incident into the display panel; and disposing the first substrate and the second substrate in a cell aligning manner.

In a fourth aspect, the present disclosure further provides a control method of a display panel applicable to any one of the aforementioned display panel, which includes:

receiving a detection signal from detection signal lines;

determining a position of light meeting the preset wavelength condition according to the detection signal; and controlling display of a pixel unit at the position of the light meeting the preset wavelength condition.

In some exemplary embodiments, after determining the position of the light meeting the preset wavelength condition according to the detection signal, the method further includes adjusting a refresh frequency of a signal provided to a pixel electrode in the pixel unit at the position of the light meeting the wavelength condition.

Other features and advantages of the present disclosure will be described in the subsequent description, and, in part, become apparent from the description, or can be understood by implementing the present disclosure. Other advantages of the present disclosure can be implemented and achieved by the solutions described in the specification and accompanying drawings.

Other aspects may be comprehended upon reading and understanding of the drawings and the detailed descriptions.

BRIEF DESCRIPTION OF DRAWINGS

The drawings are used to provide an understanding of technical solutions of the present disclosure, form a part of the specification, and are used to explain, together with the embodiments of the present disclosure, the technical solutions of the present disclosure and are not intended to form limitations on the technical solutions of the present disclosure.

DETAILED DESCRIPTION

Figure 1:
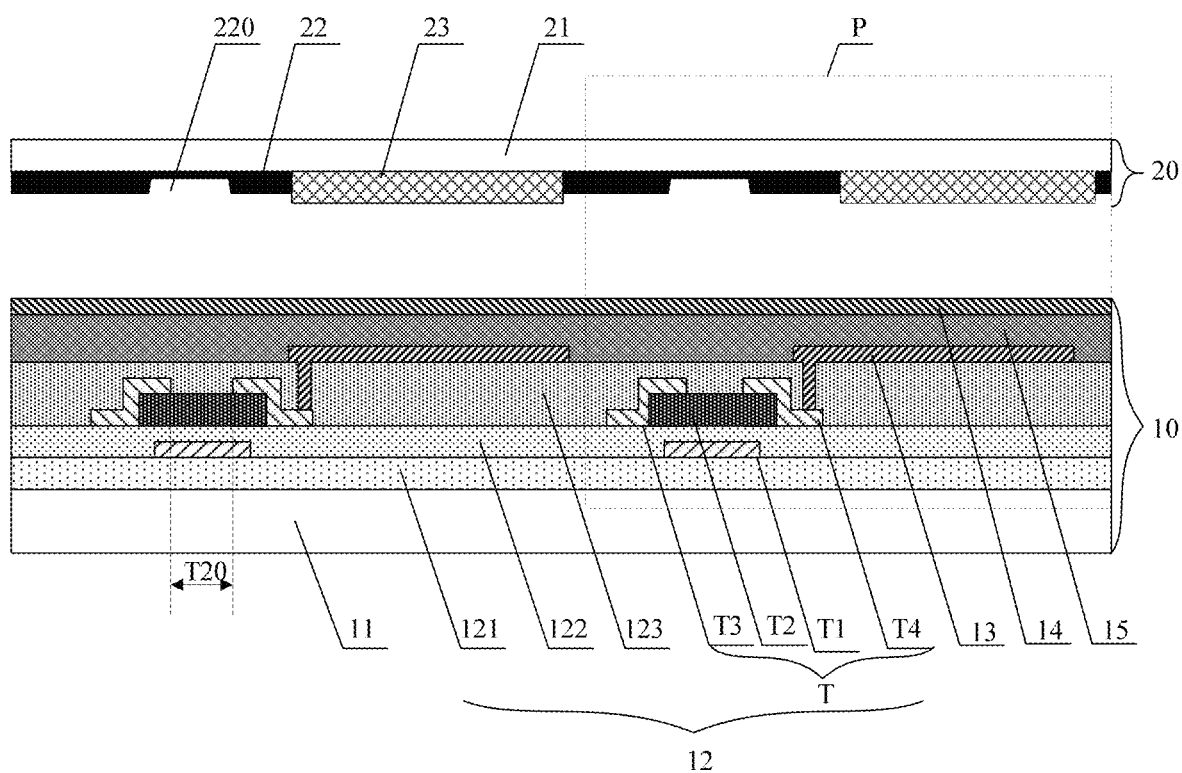
FIG. 1 is a schematic structural diagram of a display panel according to an embodiment of the present disclosure.

The present disclosure describes several embodiments, but the description is exemplary rather than restrictive, and those of ordinary skill in the art will recognize that more embodiments and implementation schemes are possible within the scope of the embodiments described in the present disclosure. Although many possible feature combinations are shown in the drawings and discussed in specific implementations, the disclosed features may also be combined in many other manners. Unless specifically restricted, any feature or element of any embodiment may be combined with any other feature or element in any other embodiment for application, or may take the place of any other feature or element in any other embodiment.

The present disclosure includes and conceives combinations of features and elements well known to those of ordinary skill in the art. The disclosed embodiments, features and elements of the present disclosure may be combined with any traditional features or elements to form a technical solution defined by the claims. Any feature or element of any embodiment may also be combined with features or elements from another technical solution to form another technical solution defined by the claims. Therefore, it should be understood that any features shown and/or discussed in the present disclosure may be implemented individually or in any appropriate combination. Therefore, no other limits are made to the embodiments, besides limits made by the appended claims and equivalent replacements thereof. In addition, various modifications and variations may be made within the scope of protection of the appended claims.

Unless otherwise defined, technical terms or scientific terms used in the present disclosure shall have common meanings as construed by those of ordinary skills in the art to which the present disclosure pertains. "First", "second", and similar terms used in the disclosure do not represent any sequence, number, or significance but are only adopted to distinguish different components. The word "comprise" or "include", etc. means that an element or article that precedes the word is inclusive of the element or article listed after the word and equivalents thereof, but does not exclude other elements or articles. Wordings such as "connect" or "connected" are not limited to physical or mechanical connection, but may include electrical connection, whether direct or indirect. "Above", "below", "left", "right", and the like are only used to indicate relative position relationships. If the absolute position of the described object changes, the relative position relationship may also change accordingly.

A liquid crystal display apparatus includes a pixel region and a non-pixel region, wherein the pixel region is composed of highly transparent materials, and the highly transparent materials have high transmittance but low reflectivity. Non-pixel region includes a black matrix, which has a higher optical density, stronger light absorption and lower reflectivity. Therefore, when a laser pen irradiates the liquid crystal display apparatus, the reflected light is weak and invisible when the laser emitted by the laser pen irradiates the surface of the liquid crystal display apparatus, and the normal control and display of the liquid crystal display apparatus by the laser pen cannot be achieved.

Figure 2:
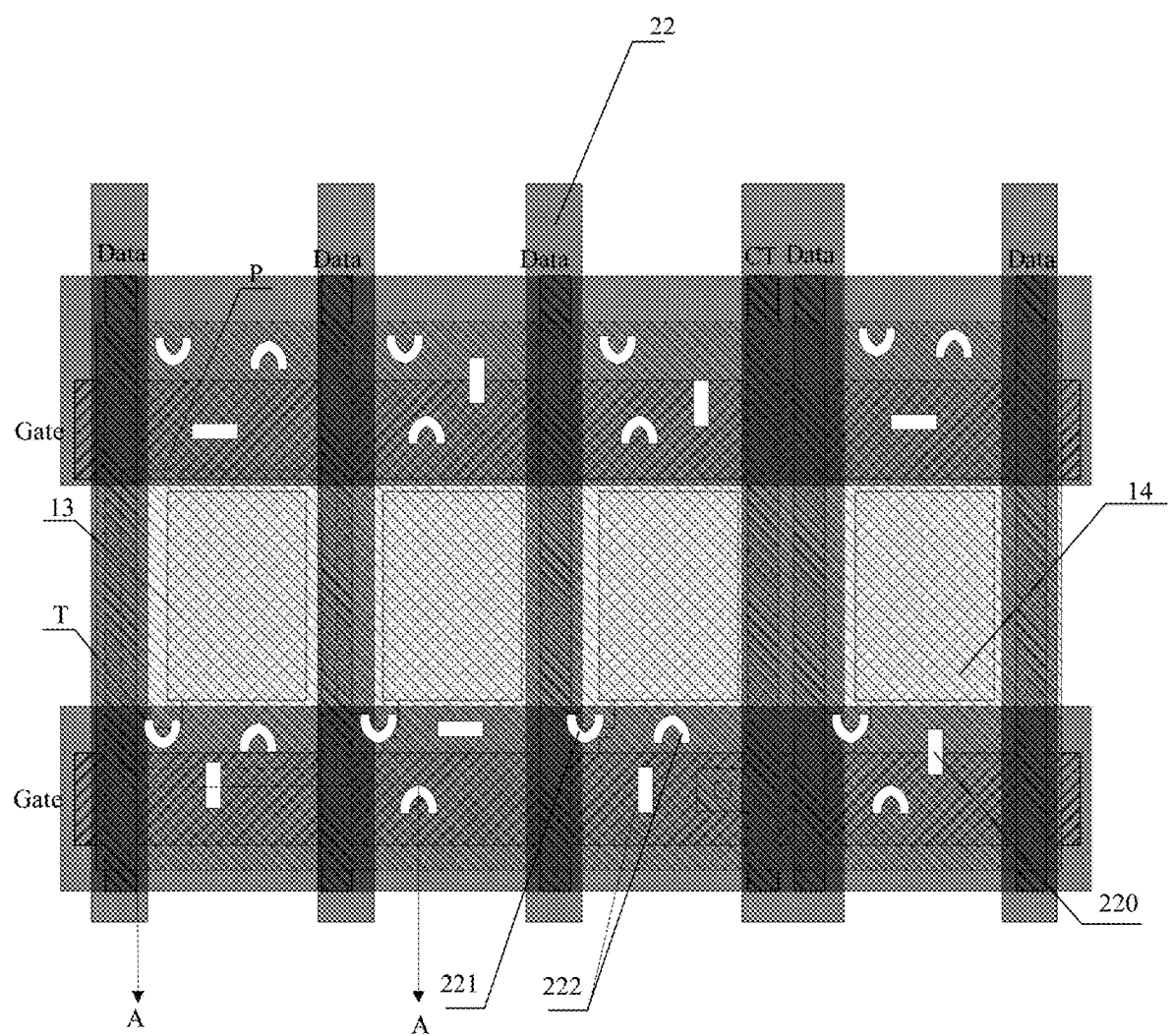
FIG. 2 is a vertical view of a display panel provided by an embodiment of the present disclosure.
Figure 3:
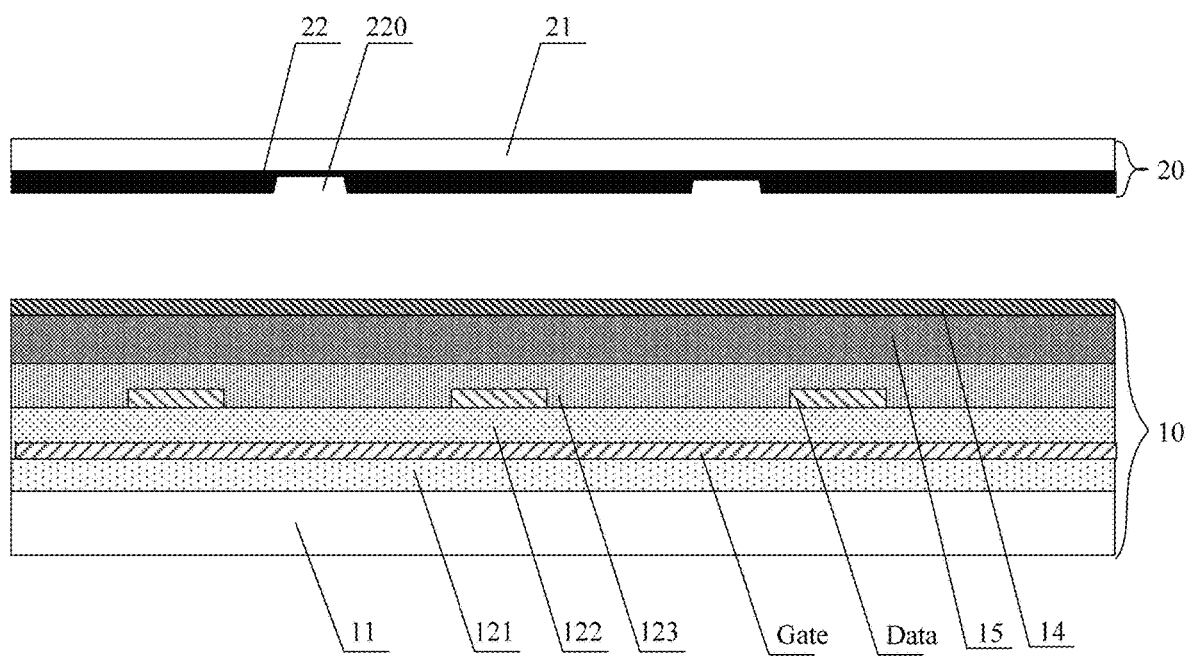
FIG. 3 is a sectional view taken along an A-A direction in FIG. 2.

FIG. 1 is a schematic structural diagram of a display panel according to an embodiment of the present disclosure. FIG. 2 is a vertical view of a display panel provided by an embodiment of the present disclosure. FIG. 3 is a sectional view taken along an A-A direction in FIG. 2. As shown in FIGS. 1 to 3, a display panel provided by an embodiment of the present disclosure includes: a first substrate 10 and a second substrate 20 disposed oppositely. The first substrate 10 includes a first base substrate 11 and a driving structure layer 12 disposed on the first base substrate 11, and the second substrate 20 includes a second base substrate 21 and a black matrix layer 22 disposed on the second base substrate 21. The driving structure layer 12 includes a plurality of switching transistors T, and the display panel includes a plurality of pixel units P, wherein each pixel unit P includes a switching transistor T. FIG. 1 illustrates two pixel units as an example.

As shown in FIGS. 1 to 3, one side of the black matrix layer 22 close to the first substrate 10 is provided with a plurality of groove structures 220 which correspond to a plurality of pixel units P in a one-to-one manner.

As shown in FIGS. 1 to 3, an orthographic projection of the black matrix layer 22 on the first base substrate 11 covers orthographic projections of a plurality of switching transistors T on the first base substrate 11, and the orthographic projection of the groove structure 220 on the first base substrate 11 at least partially overlaps with an orthographic projection of a channel region T20 of the switching transistor T in the corresponding pixel unit on the first base substrate 11 to enable the light meeting the preset wavelength condition to be incident into the display panel.

In an exemplary embodiment, the first base substrate 11 and the second base substrate 21 may be rigid substrates or flexible substrates, wherein the material of the rigid substrate may be, but is not limited to, one or more of glass and metal foil; the material of the flexible substrate may be, but is not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers.

In an exemplary embodiment, the switching transistor T includes a gate electrode T1, an active layer T2, a source electrode T3, and a drain electrode T4. The switching transistor T may be a bottom gate structure, which ensures that the light meeting the preset wavelength condition can irradiate into the channel region of the switching transistor.

In an exemplary embodiment, the channel region of the switching transistor has a length of 2 to 4 microns.

In an exemplary embodiment, the channel region may have a length of 3 microns. The ratio of the width to the length of the channel region is defined as the width-length ratio. A high width-length ratio may ensure a higher charging rate, but it will bring about a decrease in the pixel aperture ratio.

In an exemplary embodiment, the channel region of the switching transistor may have a width of 10 to 100 microns, and the width of the channel region is determined according to the charging rate requirement of the display product.

In an exemplary embodiment, the black matrix layer may be made of resin carbon black.

In an exemplary embodiment, the black matrix may have a thickness of 1 to 2 microns.

In an exemplary embodiment, the black matrix layer may have a width of 20 to 40 microns, which can prevent color mixing.

In an exemplary embodiment, as shown in FIGS. 1 and 3, the second substrate 20 may further include a color resist layer 23 and a planarization layer (not shown in the figure).

In an exemplary embodiment, the color resist layer 23 is disposed on a same layer as the black matrix layer 22, and the planarization layer is disposed on one side of the black matrix layer close to the first substrate. The planarization layer can ensure the uniformity of display.

In an exemplary embodiment, as shown in FIG. 1 and FIG. 2, the black matrix layer 22 may be in a cross shape crossed horizontally and vertically, and the color resist layer is filled in the black matrix layer.

In an exemplary embodiment, the color resist layer 23 includes a red filter, a green filter and a blue filter, and each pixel unit includes one filter.

In an exemplary embodiment, the first substrate and the second substrate may be bonded together by sealant.

In an exemplary embodiment, light meeting a preset wavelength condition means light with a wavelength smaller than the wavelength of natural light. The light meeting the preset wavelength condition has shorter wavelength and higher energy.

In an exemplary embodiment, the light meeting the preset wavelength condition may be laser or other light, which is not limited by the embodiments of the present disclosure.

In an exemplary embodiment, the black matrix layer may ensure that a non-trenched region is opaque, and a trenched region keeps a high absorption and a low transmittance for external natural light but a high transmittance for light meeting the preset wavelength condition.

In an exemplary embodiment, the laser has shorter wavelength and greater penetrability, and the diameter of the spot irradiated by the laser onto the liquid crystal display panel is 3 to 5 mm. The laser can enter the channel region of the switching transistor through the trenching structure after entering the display panel, and produces more illumination carriers, and then causes leakage current of the switching transistor larger, which affects the characteristics of the switching transistor. In an exemplary embodiment, the groove structure provided in the embodiment of the present disclosure can ensure that natural light less impact the characteristics of the switching transistor.

In an exemplary embodiment, the display panel may further include a liquid crystal layer including a plurality of liquid crystal molecules, and the liquid crystal layer is disposed between the first substrate and the second substrate and is configured to deflect according to voltages applied to the pixel electrodes and the common electrodes to achieve display of the display panel.

The display panel provided by the embodiment of the present disclosure includes a first substrate and a second substrate disposed oppositely, wherein the first substrate includes a first base substrate and a driving structure layer disposed on the first base substrate, and the second substrate includes a second base substrate and a black matrix layer disposed on the second base substrate. The driving structure layer includes a plurality of switching transistors, and the display panel includes a plurality of pixel units, wherein each pixel unit includes a switching transistor. One side of the black matrix layer close to the first substrate is provided with a plurality of groove structures which correspond to a plurality of pixel units in a one-to-one manner. An orthographic projection of the black matrix layer on the first base substrate covers orthographic projections of a plurality of switching transistors on the first base substrate, and an orthographic projection of the groove structure on the first base substrate at least partially overlaps with an orthographic projection of a channel region of a switching transistor in a corresponding pixel unit on the first base substrate to enable light meeting a preset wavelength condition to be incident into the display panel. According to the present disclosure, the groove structure is provide on the black matrix layer to enable the light meeting the preset wavelength condition to be incident into the display panel, and thus the light meeting the preset wavelength condition can remotely control on the display panel is achieved.

In an exemplary embodiment, as shown in FIG. 2, the groove structure 220 may include at least one groove; a difference between groove areas of any two groove structures is smaller than a threshold area, wherein the groove area is a sum of cross-sectional areas of all grooves in the groove structure.

In an exemplary embodiment, if the difference between the groove areas of any two groove structures is smaller than the threshold area, the sensitivity of each region of the display panel can be guaranteed to be the same, and the uniformity of the display panel can be guaranteed.

In an exemplary embodiment, the cross section of the groove may be U-shaped, or square, or other shapes.

In an exemplary embodiment, as shown in FIG. 2, the groove structure may include a first groove 221 and a second groove 222. An orthographic projection of the first groove 221 on the first base substrate at least partially overlaps with an orthographic projection of the channel region of the switching transistor on the first base substrate. There is no overlapping region between an orthographic projection of the second groove 222 on the first base substrate and an orthographic projection of the channel region of the switching transistor on the first base substrate.

In an exemplary embodiment, the number of the first grooves 221 may be at least one. FIG. 2 is described by taking one first groove as an example.

In an exemplary embodiment, the number of the second grooves 222 may be at least one. FIG. 2 is described by taking two second grooves as an example.

In an exemplary embodiment, the groove structures corresponding to pixel units in the same row or column are irregularly disposed. That is, the arrangements of the first groove and the second groove in adjacent pixel units are different. The irregular arrangement of the groove structures corresponding to the pixel units located in the same row or column can ensure that the defects of horizontal stripes and lines will not be caused by light transmission in normal display, and the display effect of the display panel can be ensured.

In an exemplary embodiment, the depth of the groove may be 70% to 90% of the thickness of the black matrix layer. The depth of the groove can not only ensure the laser to pass through the black matrix layer, but also ensure that the black matrix layer has lower transmittance under normal lightning without affecting the characteristics of the switching transistor, thus ensuring the normal display of the display panel.

In an exemplary embodiment, the width of the groove may be 3 to 5 microns.

In an exemplary embodiment, the depth of the groove may be 0.7 to 1.8 microns.

Figure 4:
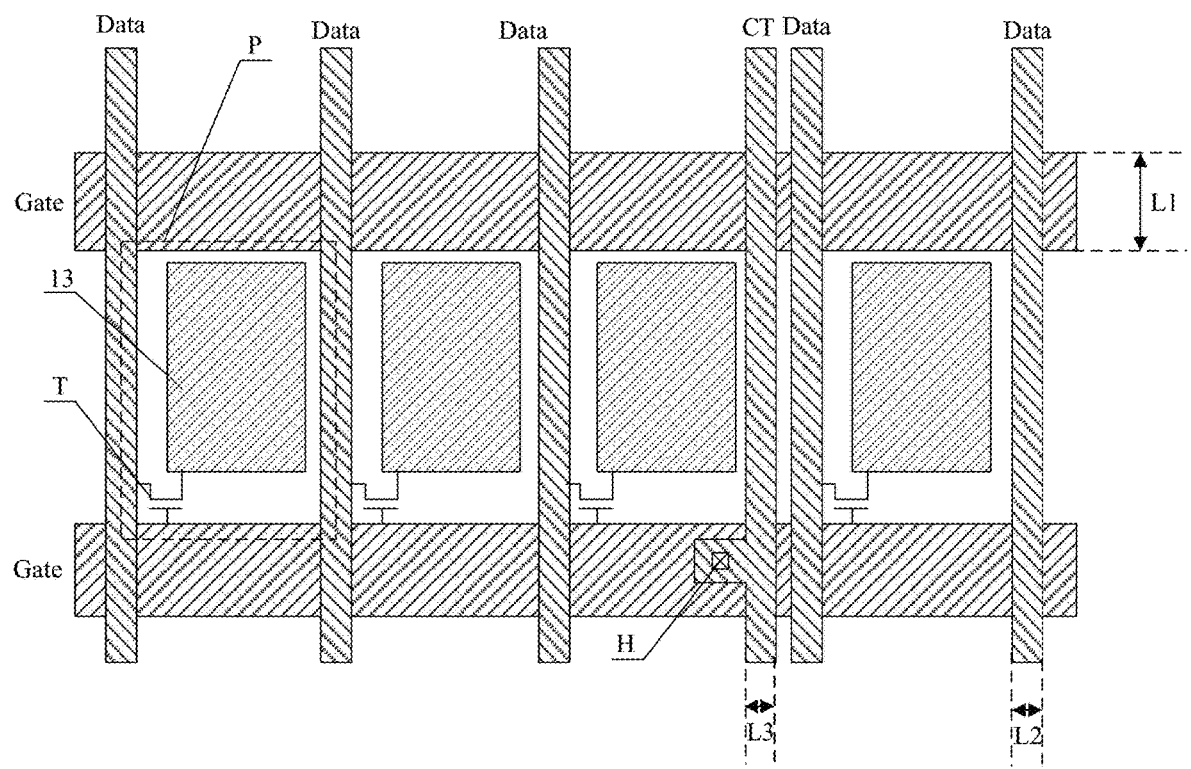
FIG. 4 is a first vertical view of a display panel according to an exemplary embodiment.

FIG. 4 is a first vertical view of a display panel according to an exemplary embodiment. As shown in FIG. 1 and FIG. 4, in an exemplary embodiment, a first substrate further includes a pixel electrode layer disposed on one side of the driving structure layer 12 away from the first base substrate, and the pixel electrode layer includes a plurality of pixel electrodes 13, each pixel unit includes one pixel electrode, and pixel electrodes of adjacent pixel units are disposed at intervals.

In an exemplary embodiment, the pixel electrode 13 may be a transparent electrode.

In an exemplary embodiment, the transparent electrode may be made of a transparent conductive material, such as indium tin oxide, which is not limited in this disclosure.

In an exemplary embodiment, the pixel electrode may be a block electrode.

Figure 5:
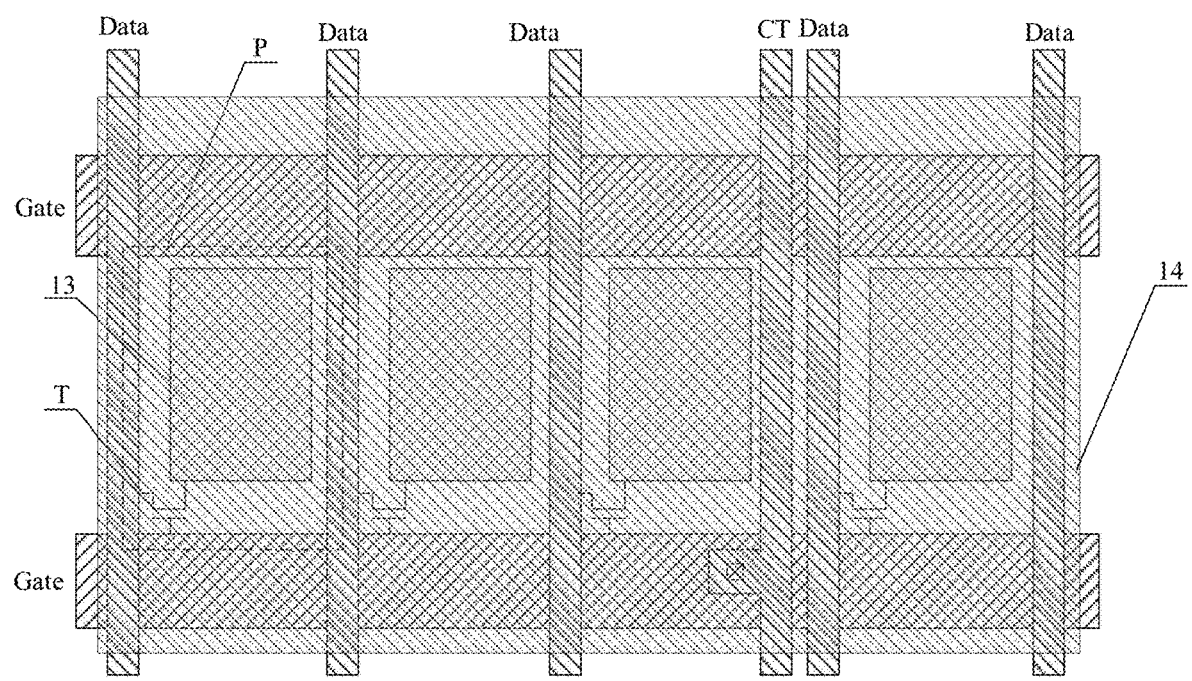
FIG. 5 is a second vertical view of a display panel according to an exemplary embodiment.

FIG. 5 is a second vertical view of a display panel according to an exemplary embodiment. As shown in FIG. 1 and FIG. 5, in an exemplary embodiment, the first substrate further includes a common electrode layer disposed on one side of the pixel electrode layer away from the first base substrate; the common electrode layer includes N common electrodes 14, each pixel unit includes a common electrode, and a plurality of pixel units share one common electrode, N≥1. There is an overlapping region between the orthographic projection of the common electrode on the first base substrate and the orthographic projection of a pixel electrode of the pixel unit on which the common electrode is located on the first base substrate.

In an exemplary embodiment, the common electrode may be a transparent electrode.

In an exemplary embodiment, the common electrode may be a slit electrode.

In an exemplary embodiment, the working process of the display panel may include a display stage and a non-display stage. The common electrode can not only form a storage capacitor between the display stage and the pixel electrode to control the deflection of the liquid crystal and achieve normal display, but also serve as a signal detection electrode in the non-display stage to detect the charge and discharge of the storage capacitor, so as to detect the position irradiated by the light meeting the preset condition.

In an exemplary embodiment, when light meeting the preset condition irradiates the liquid crystal display panel, the charge and voltage of the storage capacitor will change.

In an exemplary embodiment, the larger the number of common electrodes, the higher the detection sensitivity.

Figure 6:
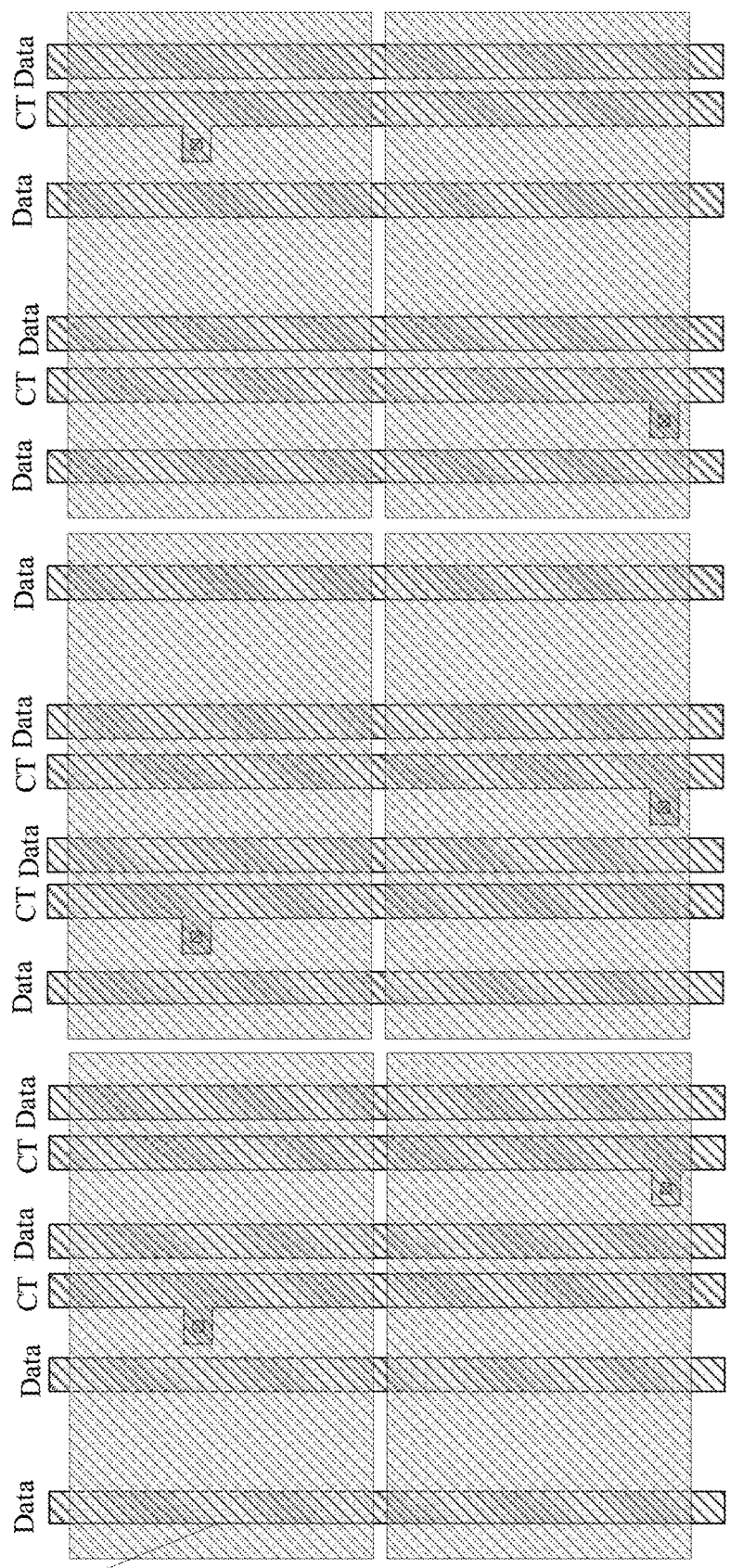
FIG. 6 is a third vertical view of a display panel according to an exemplary embodiment.
Figure 7:
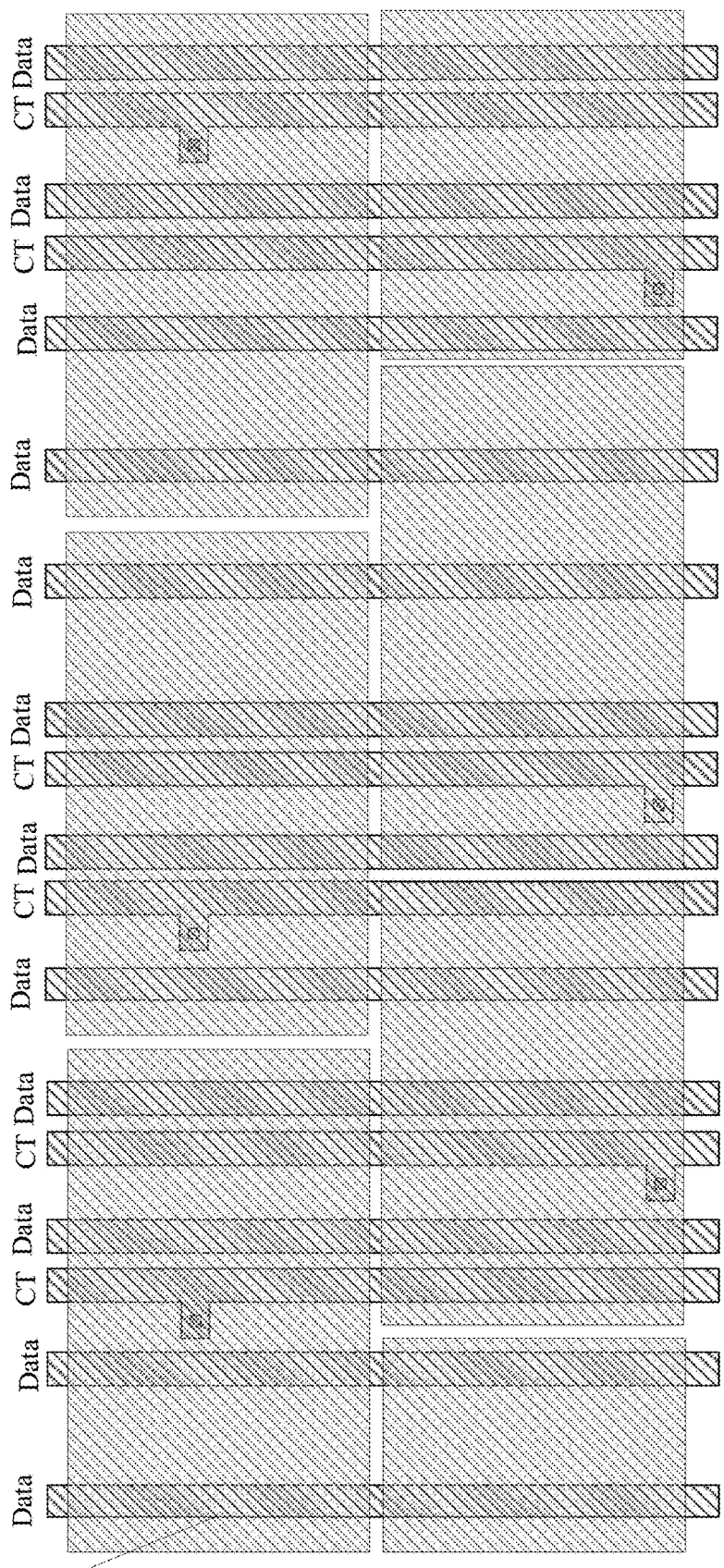
FIG. 7 is a fourth vertical view of a display panel according to an exemplary embodiment.

FIG. 6 is a third vertical view of a display panel according to an exemplary embodiment. FIG. 7 is a fourth vertical view of a display panel according to an exemplary embodiment. As shown in FIGS. 6 and 7, in an exemplary embodiment, the area of each common electrode may be same.

In an exemplary embodiment, a plurality of common electrodes may be disposed in an array or may be disposed in a non-array, and the arrangement of the common electrodes may be determined according to the size of the display panel. FIG. 6 is described by taking a common electrode array arrangement as an example, and FIG. 7 is described by taking a common electrode non-array arrangement as an example.

As shown in FIGS. 2 to 5, in an exemplary embodiment, the first substrate further includes a plurality of gate lines Gate extending along a first direction and disposed along a second direction and data lines Data extending along the second direction and disposed along the first direction; the pixel units P are defined by crossing of the gate lines Gate and the data lines Data.

As shown in FIG. 4, in an exemplary embodiment, the length L1 of the gate line Gate in the second direction may be greater than the length L2 of the data line Data in the first direction.

As shown in FIGS. 4 to 7, in an exemplary embodiment, the first substrate further includes N detection signal lines CT extending along the second direction and disposed along the first direction.

In an exemplary embodiment, the detection signal lines and the data lines are disposed in the same layer. In an exemplary embodiment, the manufacturing materials of the detection signal lines and the data lines may be the same or different, and in order to simplify the manufacturing process, the manufacturing materials of the detection signal lines and the data lines are the same.

In an exemplary embodiment, the detection signal line may be used as a touch feedback line.

As shown in FIGS. 4 to 7, in an exemplary embodiment, the detection signal lines CT correspond to the common electrodes 14 in a one-to-one manner and are electrically connected to the corresponding common electrodes.

As shown in FIG. 2, in an exemplary embodiment, the orthographic projection of the black matrix layer 22 on the first base substrate covers the orthographic projection of the detection signal line CT on the first base substrate.

As shown in FIGS. 5 to 7, in an exemplary embodiment, there is an overlapping region between the orthographic projection of the detection signal line on the first base substrate and the orthographic projection of the corresponding common electrode on the first base substrate.

As shown in FIG. 4, in an exemplary embodiment, a length L3 of the detection signal line in the second direction is 1 to 2 times as long as the length L3 of the data line in the second direction.

As shown in FIG. 1, in an exemplary embodiment, the first substrate further includes a first insulating layer 121, a first metal layer, a second insulating layer 122, a semiconductor layer, a second metal layer, a third insulating layer 123 and a fourth insulating layer 15 sequentially disposed on the first base substrate, wherein the pixel electrode layer is disposed between the third insulating layer 123 and the fourth insulating layer 15, and the common electrode layer is disposed on one side of the fourth insulating layer 15 away from the first base substrate 11.

In an exemplary embodiment, the first metal layer may include a gate line Gate and a gate electrode of a switching transistor.

In an exemplary embodiment, the gate line Gate and the gate electrode of the switching transistor are formed by using a same manufacturing process, and the manufacturing material thereof may be, such as argentum (Ag), copper (Cu), aluminum (Al), molybdenum (Mo), or alloy materials of the above metals, such as aluminum neodymium alloy (AlNd), molybdenum niobium alloy (MoNb), or multi-layer metals, such as Mo/Cu/Mo, or a stacked structure formed by metals and transparent conductive materials, such as ITO/Ag/ITO.

In an exemplary embodiment, the semiconductor layer may include an active layer of the switching transistor.

In an exemplary embodiment, a manufacturing material of the semiconductor layer may include amorphous silicon.

In an exemplary embodiment, the channel region is mainly composed of amorphous silicon and amorphous silicon doped with positive pentavalent metal p, which provides high-concentration carriers under positive voltage bias. It can ensure that the switching transistor is turned on, charges the pixel electrode, and maintain the pixel voltage under negative pressure with good turn-off characteristics. In addition, the semiconductor layer made of amorphous silicon will generate illumination carriers under illumination, which will form an illumination leakage current and affect the characteristics of the switching transistor.

In an exemplary embodiment, a second metal layer may include a data line Data, a detection signal line CT, and source and drain electrodes of the switching transistor.

In an exemplary embodiment, the data line Data, the detection signal line CT, and the source and drain electrodes of the switching transistor are formed by using a same manufacturing process, and the manufacturing material thereof may be, such as argentum (Ag), copper (Cu), aluminum (Al), molybdenum (Mo), or alloy materials of the above metals, such as aluminum neodymium alloy (AlNd), molybdenum niobium alloy (MoNb), or multi-layer metals, such as Mo/Cu/Mo, or a stacked structure formed by metals and transparent conductive materials, such as ITO/Ag/ITO.

In an exemplary embodiment, the first insulating layer 121 is a buffer layer, which may be made of silicon oxide (SiOx), silicon nitride (SiNx), silicon oxynitride (SiON), etc., or high dielectric materials such as aluminum oxide (AlOx), hafnium oxide (HfOx), tantalum oxide (TaOx), etc., and may be of a structure of a single layer, multiple layers, or a composite layer.

In an exemplary embodiment, the second insulating layer 122 is a gate insulating layer, and may be made of silicon oxide SiOx, silicon nitride SiNx, or silicon oxynitride SiON In an exemplary embodiment, the third insulating layer 123 is a passivation layer, and may be made of silicon oxide SiOx, silicon nitride SiNx, or silicon oxynitride SiON.

In an exemplary embodiment, the fourth insulating layer 15 is a planarization layer, and may be made of polyimide.

As shown in FIG. 2 and FIGS. 4 to 7, in an exemplary embodiment, the third insulating layer and the fourth insulating layer are provided with a via H, and the common electrode 14 are electrically connected to the corresponding detection signal line CT through the via H.

In an exemplary embodiment, the display panel further includes a processor; and the processor is electrically connected to the detection signal lines, and is configured to receive the detection signal from the detection signal lines, determine the position of the light meeting the wavelength condition according to the detection signal, and control the display of the pixel unit at the position of the light meeting the wavelength condition.

In an exemplary embodiment, the processor may be the same processor as the timing controller in the display panel, or may be a processor different from the timing controller in the display panel.

In an exemplary embodiment, the processor controlling the display of the pixel unit at the position of the light meeting the wavelength condition means that in the non-display stage, the processor controls the pixel unit at the position of the light meeting the wavelength condition to output a specific color pattern in the next frame, so as to achieve the remote control on the display panel by the laser.

In an exemplary embodiment, the magnitude of laser energy and the length-to-width ratio of the channel region may be controlled. When the laser is irradiated and the energy is high, the leakage current generated by the switching transistor is much larger than the normal turn-off current, the pixel voltage cannot be maintained, and the liquid crystal cannot be deflected normally. For the Advanced Super Dimension Switch (ADS) mode, when the display content of the display panel is black, the load of the processor may be reduced, and it is not necessary to detect and control the output of specific color patterns alone in the non-display stage.

In an exemplary embodiment, when the processor detects that the pixel voltage is abnormal due to laser irradiation in the non-display stage, the refresh frequency of the signal provided to the pixel electrode may be adjusted, the pixel voltage differentiation may be further increased by reducing the refresh frequency and increasing the time of leakage, which can ensure that change of the pixel voltage is sufficiently large under laser irradiation, and can increase the detection sensitivity. If there is no laser irradiation, the leakage current value is small, and the voltage decrease amplitude is small in time interval of every two frame frequency changes.

It should be noted that all technologies and proposals, including but not limited to the implementations listed in this disclosure, in which the pixel unit is caused to display abnormally through external light, and the characteristic difference of the switching transistor is caused, and the processor displays a specific display pattern in a specific region according to the detected difference are all within the protection scope of this disclosure.

An embodiment of the present disclosure further provides a display apparatus, including a display panel.

The display panel is provided by the above embodiments. The implementation principle and implementation effect are similar, which will not be described herein in detail.

In an exemplary embodiment, the display apparatus may be any product or component with a display function such as a mobile phone, a tablet computer, a television, a display, a notebook computer, a digital photo frame, a navigator. Other essential components included by the display apparatus which should be understood by those of ordinary skill in the art will not be described repeatedly herein, and should not be taken as a limitation to the present disclosure.

An embodiment of the disclosure further provides a manufacturing method of a display panel including a plurality of pixel units, the method includes the following acts S11-S13.

In act S11, a driving structure layer is formed on a first base substrate to form a first substrate.

In an exemplary embodiment, the driving structure layer includes a plurality of switching transistors, and each pixel unit includes one switching transistor.

In act S12, a black matrix layer provided with a plurality of groove structures is formed on the second base substrate by using a halftone mask process to form a second substrate.

In an exemplary embodiment, the groove structure is disposed on one side of the black matrix layer close to the first substrate.

In an exemplary embodiment, a plurality of groove structures correspond to a plurality of pixel units in a one-to-one manner. An orthographic projection of the black matrix layer on the first base substrate covers orthographic projections of a plurality of switching transistors on the first base substrate, and an orthographic projection of the groove structure on the first base substrate at least partially overlaps with an orthographic projection of a channel region of a switching transistor in a corresponding pixel unit on the first base substrate to enable light meeting a preset wavelength condition to be incident into the display panel.

In act S13, the first substrate and the second substrate are disposed in a cell aligning manner.

The display panel is provided by the above embodiments. The implementation principle and implementation effect are similar, which will not be described herein in detail.

In an exemplary embodiment, forming the driving structure layer on the first base substrate may include sequentially forming a first insulating layer, a first metal layer, a second insulating layer, an active layer, a second metal layer and a third insulating layer on the first base substrate.

In an exemplary embodiment, after forming the driving structure layer on the first base substrate, the manufacturing method of the display panel may further include sequentially forming a pixel electrode layer, a fourth insulating layer and a common electrode layer on the driving structure layer.

In an exemplary embodiment, after forming a black matrix layer provided with a plurality of groove structures on the second base substrate by using a halftone mask process to form a second substrate, the method may further include sequentially forming a color resist layer and a planarization layer on the second base substrate.

Figure 8:
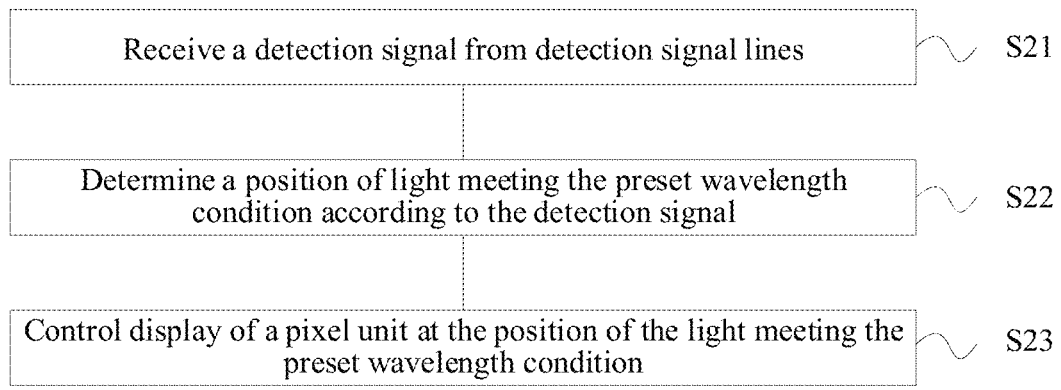
FIG. 8 is a flowchart of a control method of a display panel according to an embodiment of the present disclosure.

FIG. 8 is a flowchart of a control method of a display panel according to an embodiment of the present disclosure. As shown in FIG. 8, an embodiment of the disclosure further provides a control method of a display panel provided by an embodiment of the present disclosure. The control method of the display panel is applied to the display panel, and may include the following act S21-S23.

In act S21, a detection signal from detection signal lines is received.

In act S22, a position of light meeting the wavelength condition is determined according to the detection signal.

In act S23, display of the pixel unit at the position of the light meeting the wavelength condition is controlled.

In an exemplary embodiment, act S23 may include controlling the pixel unit at the position of the light meeting the wavelength condition to output a specific color pattern.

The display panel is provided by the above embodiments. The implementation principle and implementation effect are similar, which will not be described herein in detail.

In an exemplary embodiment, after act S22, the control method of the display panel provided by an exemplary embodiment may further include adjusting a refresh frequency of a signal provided to the pixel electrode in the pixel unit at the position of the light meeting the wavelength condition.

In an exemplary embodiment, the refresh frequency of the signal provided to the pixel electrode may be adjusted, the pixel voltage differentiation may be further increased by reducing the refresh frequency and increasing the time of leakage, which can ensure that change of the pixel voltage is sufficiently large under laser irradiation and can increase the detection sensitivity.

It can be understood by those of ordinary skill in the art that all or some acts in the method disclosed above and function modules/units in the system and the apparatus may be implemented as software, firmware, hardware, and proper combinations thereof. In a hardware implementation, division of the function modules/units mentioned in the above description is not always division corresponding to physical components. For example, a physical component may have multiple functions, or a plurality of physical components may cooperate to execute a function or act. Some components or all components may be implemented as software executed by a processor such as a digital signal processor or a microprocessor, or implemented as hardware, or implemented as integrated circuits such as application specific integrated circuits. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile and removable and irremovable media implemented in any method or technology for storing information (for example, a computer-readable instruction, a data structure, a program module, or other data). The computer storage medium includes, but is not limited to, a RAM, a ROM, an Electrically Erasable Programmable Read-Only Memory (EEPROM), a flash memory or other memory technologies, a CD-ROM, a Digital Video Disk (DVD) or other compact discs, a cassette, a magnetic tape, a disk memory or other magnetic storage devices, or any other medium configurable to store expected information and accessible for a computer. In addition, it is known to those of ordinary skill in the art that the communication medium usually includes a computer-readable instruction, a data structure, a program module, or other data in a modulated data signal of, such as, a carrier or another transmission mechanism, and may include any information transmission medium.

The drawings in the present disclosure only involve the structures included in the embodiments of the present disclosure, and other structures may refer to common designs.

For clarity, the thickness and dimension of layers or micro-structures are magnified in the accompanying drawings used for describing the embodiments of the present disclosure. It can be understood that when an element, such as a layer, a film, an area or a substrate, is referred to as being located "above" or "below" another element, the element may be "directly" located "above" or "below" another element, or an intermediate element may exist.

Although the embodiments disclosed in the present disclosure are as described above, the content described is only the embodiments used to facilitate the understanding of the present disclosure, and is not intended to limit the present disclosure. Anyone skilled in the art to which the present disclosure belongs can make any modifications and changes in the implementation forms and details without departing from the spirit and scope disclosed in the present disclosure. However, the scope of patent protection of the present disclosure is still subject to the scope defined by the appended claims.

What we claim is:

1. A display panel, comprising a first substrate and a second substrate disposed oppositely, wherein the first substrate comprises a first base substrate and a driving structure layer disposed on the first base substrate, and the second substrate comprises a second base substrate and a black matrix layer disposed on the second base substrate, the driving structure layer comprises a plurality of switching transistors, and the display panel comprises a plurality of pixel units, wherein each pixel unit comprises a switching transistor;

one side of the black matrix layer close to the first substrate is provided with a plurality of groove structures which correspond to a plurality of pixel units in a one-to-one manner; and an orthographic projection of the black matrix layer on the first base substrate covers orthographic projections of a plurality of switching transistors on the first base substrate, and an orthographic projection of the groove structure on the first base substrate at least partially overlaps with an orthographic projection of a channel region of a switching transistor in a corresponding pixel unit on the first base substrate to enable light meeting a preset wavelength condition to be incident into the display panel;

wherein the groove structure comprises at least one groove; a difference between groove areas of any two groove structures is smaller than a threshold area, wherein the groove area is a sum of cross-sectional areas of all grooves in the groove structure; and groove structures corresponding to pixel units in a same row or column are irregularly disposed.

2. The display panel according to claim 1, wherein a cross section of the groove is U-shaped or square.

3. The display panel according to claim 2, wherein a thickness of the black matrix layer is 1 to 2 microns, and a width of the black matrix layer is 20 to 40 microns; and a width of the groove is 3 to 5 microns, and a depth of the groove is 0.7 to 1.8 microns.

4. The display panel according to claim 1, wherein a depth of the groove is 70% to 90% of a thickness of the black matrix layer.

5. The display panel according to claim 1, wherein the first substrate further comprises a pixel electrode layer disposed on one side of the driving structure layer away from the first base substrate, and the pixel electrode layer comprises a plurality of pixel electrodes, each pixel unit comprises a pixel electrode, and pixel electrodes of adjacent pixel units are disposed at intervals; and the pixel electrodes are transparent electrodes and are block electrodes.

6. The display panel according to claim 5, wherein the first substrate further comprises a common electrode layer disposed on one side of the pixel electrode layer away from the first base substrate; the common electrode layer comprises N common electrodes, each pixel unit comprises a common electrode, and a plurality of pixel units share one common electrode, $N \geq 1$;

an orthographic projection of the common electrode on the first base substrate at least partially overlaps with an orthographic projection of a pixel electrode of a pixel unit on which the common electrode is located on the first base substrate; and the common electrodes are transparent electrodes and are slit electrodes.

7. The display panel according to claim 6, wherein an area of each common electrode is same.

8. The display panel according to claim 6, wherein the first substrate further comprises a plurality of gate lines extending along a first direction and disposed along a second direction and data lines extending along the second direction and disposed along the first direction; the pixel units are defined by crossing of the gate lines and the data lines; a length of the gate lines along the second direction is greater than a length of the data lines along the first direction;

the first substrate further comprises N detection signal lines extending along the second direction and disposed along the first direction;

the detection signal lines are disposed on a same layer as the data lines, and correspond to the common electrodes in a one-to-one manner and are electrically connected to corresponding common electrodes; and an orthographic projection of the black matrix layer on the first base substrate covers orthographic projections of the detection signal lines on the first base substrate, and there is an overlapping region between an orthographic projection of the detection signal line on the first base substrate and an orthographic projection of a corresponding common electrode on the first base substrate.

9. The display panel according to claim 8, wherein a length of the detection signal lines along the second direction is 1 to 2 times as long as that of the data lines along the second direction.

10. The display panel according to claim 8, wherein the first substrate further comprises a first insulating layer, a first metal layer, a second insulating layer, a semiconductor layer, a second metal layer, a third insulating layer and a fourth insulating layer sequentially disposed on the first base substrate, wherein the pixel electrode layer is disposed between the third insulating layer and the fourth insulating layer, and the common electrode layer is disposed on one side of the fourth insulating layer away from the first base substrate; and the first metal layer comprises a gate line and a gate electrode of a switching transistor, the semiconductor layer comprises an active layer of the switching transistor, and the second metal layer comprises a data line, a detection signal line and source and drain electrodes of the switching transistor.

11. The display panel according to claim 10, wherein the third insulating layer and the fourth insulating layer are provided with vias, and the common electrodes are electrically connected to corresponding detection signal lines through the vias.

12. The display panel according to claim 10, wherein a manufacturing material of the semiconductor layer comprises amorphous silicon.

13. The display panel according to claim 8, wherein the display panel further comprises a processor;

the processor is electrically connected to the detection signal lines, and is configured to receive a detection signal from the detection signal lines, determine a position of light meeting the preset wavelength condition according to the detection signal, and control display of a pixel unit at the position of the light meeting the preset wavelength condition.

14. A control method of a display panel, applied to the display panel of claim 8, and comprising:

receiving a detection signal from the detection signal lines;

determining a position of light meeting the preset wavelength condition according to the detection signal; and controlling display of a pixel unit at the position of the light meeting the preset wavelength condition.

15. The control method according to claim 14, wherein after determining the position of the light meeting the preset wavelength condition according to the detection signal, the method further comprises:

adjusting a refresh frequency of a signal provided to a pixel electrode in the pixel unit at the position of the light meeting the preset wavelength condition.

16. The display panel according to claim 1, wherein a length of the channel region of the switching transistor is 2 to 4 microns and a width of the channel region of the switching transistor is 10 to 100 microns.

17. The display panel according to claim 1, wherein the light meeting the preset wavelength condition is laser.

18. A display apparatus, comprising a display panel which comprises a first substrate and a second substrate disposed oppositely, wherein the first substrate comprises a first base substrate and a driving structure layer disposed on the first base substrate, and the second substrate comprises a second base substrate and a black matrix layer disposed on the second base substrate, the driving structure layer comprises a plurality of switching transistors, and the display panel comprises a plurality of pixel units, wherein each pixel unit comprises a switching transistor;

one side of the black matrix layer close to the first substrate is provided with a plurality of groove structures which correspond to a plurality of pixel units in a one-to-one manner; and an orthographic projection of the black matrix layer on the first base substrate covers orthographic projections of a plurality of switching transistors on the first base substrate, and an orthographic projection of the groove structure on the first base substrate at least partially overlaps with an orthographic projection of a channel region of a switching transistor in a corresponding pixel unit on the first base substrate to enable light meeting a preset wavelength condition to incident into the display panel;

wherein the groove structure comprises at least one groove; a difference between groove areas of any two groove structures is smaller than a threshold area, wherein the groove area is a sum of cross-sectional areas of all grooves in the groove structure; and groove structures corresponding to pixel units in a same row or column are irregularly disposed.

19. A manufacturing method of a display panel, wherein the display panel comprises a plurality of pixel units, the manufacturing method comprises:

forming a driving structure layer on a first base substrate to form a first substrate, wherein the driving structure layer comprises a plurality of switching transistors, and each pixel unit comprises a switching transistor;

forming a black matrix layer provided with a plurality of groove structures on a second base substrate by using a halftone mask process to form a second substrate; wherein the groove structures are disposed on one side of the black matrix layer close to the first substrate, and a plurality of groove structures correspond to a plurality of pixel units in a one-to-one manner; and an orthographic projection of the black matrix layer on the first base substrate covers orthographic projections of a plurality of switching transistors on the first base substrate, and an orthographic projection of the groove structure on the first base substrate at least partially overlaps with an orthographic projection of a channel region of a switching transistor in a corresponding pixel unit on the first base substrate to enable light meeting a preset wavelength condition to be incident into the display panel; and disposing the first substrate and the second substrate in a cell aligning manner;

wherein the groove structure comprises at least one groove; a difference between groove areas of any two groove structures is smaller than a threshold area, wherein the groove area is a sum of cross-sectional areas of all grooves in the groove structure; and groove structures corresponding to pixel units in a same row or column are irregularly disposed.

* * * * *